United States Patent
Gabriel et al.

(10) Patent No.: US 8,709,252 B2
(45) Date of Patent: Apr. 29, 2014

(54) FILTER UNIT FOR TREATING WATER AND OTHER LIQUID MEDIA

(75) Inventors: Kay Gabriel, Jeddah (SA); Christof Gränitz, Wahlschied (DE)

(73) Assignee: ItN Nanovation AG (DE)

( * ) Notice: Subject to any disclaimer, the term of this patent is extended or adjusted under 35 U.S.C. 154(b) by 316 days.

(21) Appl. No.: 13/057,192

(22) PCT Filed: Aug. 4, 2009

(86) PCT No.: PCT/EP2009/005631
§ 371 (c)(1),
(2), (4) Date: Mar. 1, 2011

(87) PCT Pub. No.: WO2010/015374
PCT Pub. Date: Feb. 11, 2010

(65) Prior Publication Data
US 2011/0198278 A1    Aug. 18, 2011

(30) Foreign Application Priority Data
Aug. 4, 2008  (DE) .......................... 10 2008 036 920

(51) Int. Cl.
*B01D 63/08*    (2006.01)
*B01D 71/02*    (2006.01)

(52) U.S. Cl.
USPC ................. 210/321.75; 210/232; 210/321.84; 210/323.1; 210/510.1

(58) Field of Classification Search
USPC ............ 210/232, 252, 321.75, 321.84, 323.1, 210/340, 510.1; 264/261
See application file for complete search history.

(56) References Cited

U.S. PATENT DOCUMENTS

| | | |
|---|---|---|
| 4,816,150 A | 3/1989 | Pierrard et al. |
| 4,936,988 A | 6/1990 | Lueck et al. |
| 7,135,114 B2 | 11/2006 | Nonninger et al. |
| 2005/0000881 A1 | 1/2005 | Bruss |
| 2006/0163142 A1 | 7/2006 | Nonninger et al. |

(Continued)

FOREIGN PATENT DOCUMENTS

| | | |
|---|---|---|
| DE | 26 03 505 A1 | 8/1977 |
| DE | 87 05 679.8 U1 | 7/1987 |

(Continued)

OTHER PUBLICATIONS

English translation of DE 19807769 A1 (Aug. 1999).*

(Continued)

*Primary Examiner* — John Kim
(74) *Attorney, Agent, or Firm* — DLA Piper LLP (US)

(57) ABSTRACT

A filter unit for treating water includes at least two ceramic filter membranes; and a mount for the at least two ceramic filter membranes, wherein the ceramic filter membranes are formed in the shape of plates and each have a filter-active outer side and at least one internally lying discharge channel for filtered water, the mount has a collection space, via which water leaving the discharge channels can be drained, and the mount has at least two sockets that liquid-tight fix the at least two ceramic filter membranes in which they are fixed so that the internally lying discharge channels are in communicating connection with the collection space and at least the part of the mount having the sockets for the ceramic filter membranes is a shaped part formed in one piece.

14 Claims, 3 Drawing Sheets

(56) References Cited

U.S. PATENT DOCUMENTS

| | | |
|---|---|---|
| 2008/0179245 A1 | 7/2008 | Gans et al. |
| 2009/0236295 A1 | 9/2009 | Braun et al. |
| 2009/0314710 A1 | 12/2009 | Braun et al. |

FOREIGN PATENT DOCUMENTS

| | | |
|---|---|---|
| DE | 39 12741 A1 | 12/1989 |
| DE | 43 29 473 C1 | 8/1994 |
| DE | 198 07 769 A1 | 8/1999 |
| DE | 103 05 865 B4 | 6/2006 |
| EP | 0 602 560 A1 | 6/1994 |
| EP | 0 738 534 A2 | 10/1996 |
| EP | 1 721 656 A1 | 11/2006 |
| WO | 03/037489 A1 | 5/2003 |
| WO | 2004/071620 A1 | 8/2004 |
| WO | 2004/091755 A1 | 10/2004 |
| WO | 2007/093440 A1 | 8/2007 |
| WO | 2007/093441 A1 | 8/2007 |
| WO | 2007/128565 A2 | 11/2007 |

OTHER PUBLICATIONS

English translation of WO 2007/128565 (Nov. 2007).*

* cited by examiner

FILTER UNIT FOR TREATING WATER AND OTHER LIQUID MEDIA

RELATED APPLICATIONS

This is a §371 of International Application No. PCT/EP2009/005631, with an international filing date of Aug. 4, 2009 (WO 2010/015374 A1, published Feb. 11, 2010), which is based on German Patent Application No. 10 2008 036 920.9, filed Aug. 4, 2008, the subject matter of which is incorporated by reference.

TECHNICAL FIELD

This disclosure relates to a filter unit, in particular for treating water, comprising at least two ceramic filter membranes and a mount for the at least two ceramic filter membranes, and to a method for producing such a filter unit.

BACKGROUND

Conventional sewage plants generally contain a clarifying tank in which coarse components are removed from the waste water in a first step, an activated sludge tank and a secondary clarifying tank. Microorganisms are used in the activated sludge tank to decompose the fecal matter and other organic substances contained in the waste water. In the secondary clarifying tank, following on from the activated sludge tank, these microorganisms are normally separated from the waste water by sedimentation, and optionally recycled at least partially into the activated sludge tank. However, full separation of the microorganisms, particularly by a sedimentation process, is generally not possible in this case, so that there is a risk that the microorganisms, some of which constitute a health risk, can enter the environment with the waste water. In general, this is unacceptable. For this reason, the purified waste water coming from the activated sludge tank is treated further with filter units to reliably separate microorganisms which are present.

Besides filter units having plastic filter membranes, as are known, for example, from EP-A1-602560, WO-A-03/037489 or WO-A-04/091755, filter units having ceramic-based filters have also become widespread in recent years.

For instance, DE-A-2603505 describes a flat membrane module for separating processes in the liquid phase. The filters described therein are, however, only suitable for practical use in the applications mentioned above. For example, they do not have channels arranged inside the filter, through which the filtrate could be extracted. The consequence of this is that only one side of the filter can ever be exposed to the liquid to be filtered, and the filtrate must always be extracted via the respective opposite side of the filter.

DE-C-4329473 likewise presents pressure-stable inorganic filter membranes which, however, are very elaborate to produce. For instance, two halves in the shape of plates with semicircular indentations, which then subsequently form the internally extending filtrate channels, have to be sintered together.

On the other hand, DE-A-19807769 presents a mount for ceramic microfilters, into which a flat ceramic filter (membrane plate) can be fitted. To this end a recess, the contour of which corresponds approximately in plan view to the cross section of the microfilter fitted in it, is provided on the mount. The required liquid-tightness is achieved with the aid of rubber seals, which are placed between the walls of the recess and the microfilter. In this way, the liquid to be filtered can flow freely over a large part of the filter fitted into the mount, and the filtrate is discharged through the mount with the aid of a slight negative pressure via the channels provided inside the filter. The selected configuration of the mount, and of the filter unit formed therefrom, may, however, sometimes be disadvantageous since rubber seals sometimes cannot provide the required liquid-tightness. This may, in particular, be important when flushing out the filter unit. In this case, the flow of liquid is fed back through the filter, usually at a relatively high pressure, to clean the filter surface and the inside of the filter from contaminants present there (retentate with microorganisms, etc.).

A different approach from this is adopted in WO-A-07/128565 which describes fixing flat ceramic filters by adhesive bonding in their mounts to obtain a simple and reliable seal. Particularly in large filter units, which comprise a multiplicity of separate flat filters and corresponding mounts, the outlay associated with adhesive bonding was however considerable.

It could therefore be helpful to provide a filter system without the disadvantages mentioned above. In particular, it could be helpful to provide a filter system which has a structure that is as simple as possible and which is produced in few steps. When assembled, it should have a high degree of leak-tightness.

SUMMARY

We provide a filter unit for treating water including at least two ceramic filter membranes, and a mount for the at least two ceramic filter membranes, wherein the ceramic filter membranes are formed in the shape of plates and each have a filter-active outer side and at least one internally lying discharge channel for filtered water, the mount has a collection space, via which water leaving the discharge channels can be drained, and the mount has at least two sockets that liquid-tight fix the at least two ceramic filter membranes in which they are fixed so that the internally lying discharge channels are in communicating connection with the collection space and at least the part of the mount having the sockets for the ceramic filter membranes is a shaped part formed in one piece.

We also provide a method for producing the filter unit, including arranging at least two ceramic filter membranes inside a mold and a mount in which the ceramic filter membranes are fixed and molding or injection molding them from a liquid polymer compound or from a liquid prepolymer.

DETAILED DESCRIPTION

Figure 1:
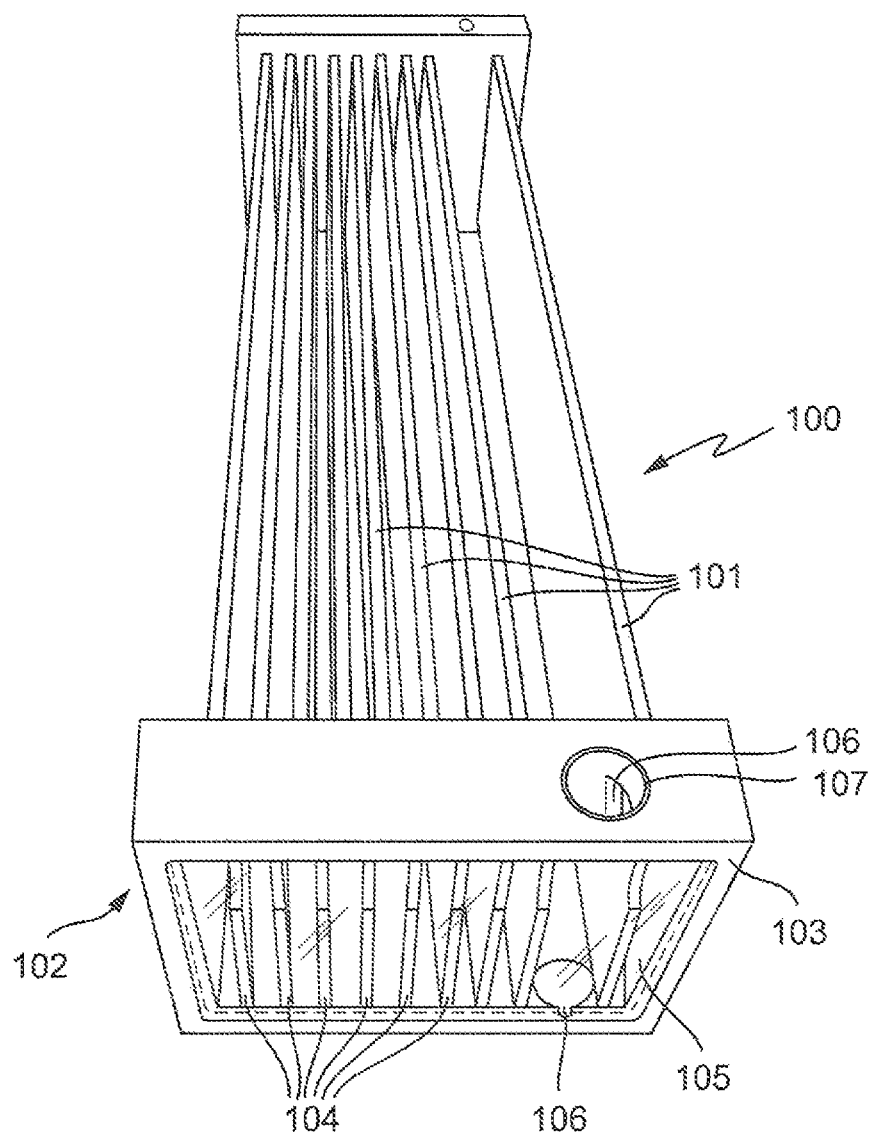
FIG. 1 shows a plan view from above of an example of a filter unit consisting of a plurality of ceramic filter membranes and two mounts.

The filter unit comprises at least two ceramic filter membranes and a mount for the at least two ceramic filter membranes. The ceramic filter membranes are formed in the shape of plates. They each have a filter-active outer side and at least one internally lying discharge channel for filtered water. The mount comprises a collection space, via which water leaving the discharge channels can be drained. The mount furthermore has at least two sockets for liquid-tight fastening or fixing of the at least two ceramic filter membranes, in which they are fastened or fixed so that the internally lying discharge channels are in communicating connection with the collection space. Preferably, the discharge channels of the at least two ceramic filter membranes, or the outlet openings, open directly into the collection space.

The filter unit is particularly distinguished in that at least the part of the mount having the sockets for the ceramic filter membranes, and in some preferred forms the entire mount, is a shaped part formed in one piece. Thus, in contrast to the prior art, not every filter membrane in a filter unit has its own mount. Instead, a plurality of filter membranes are preferably fixed in one mount. Correspondingly, there is also preferably no need for a separate filtrate collection channel, as is provided, for example, in WO-A-07/128565. The filter unit consists of fewer components than conventional filter units, and directly for this reason it has superior leaktightness properties.

Filter membranes suitable for a filter unit are known from the prior art. In this context, reference is made in particular to the flat ceramic membranes which are described in WO-A-07/128565, WO-A-07/093440 and WO-A-07/093441.

Preferably, a filter unit is furthermore particularly characterized in that the at least two ceramic filter membranes are fixed in the sockets of the mount without auxiliary or connection means, that is to say in particular without a sealing or adhesive means. In other words, the ceramic filter membranes are fixed in the sockets without a seal and free from adhesive. Instead, the filter membranes lie in the sockets with such a fit that sealing is not necessary. The sizes of the filter membranes essentially correspond exactly to the dimensions of the sockets in which they are fixed.

This can be achieved in that the mount, or at least a part of the mount, is produced "in direct contact" with the at least two ceramic filter membranes, for example, from a liquid plastic (more about this below). The ceramic filter membranes are then molded into the resulting mount. The consequence is that it has been possible to further reduce the number of individual components of a filter unit so that it has been possible to further increase its reliability.

It is correspondingly particularly preferred for at least the one-piece shaped part having the sockets, and in some forms essentially the entire mount, to be a plastic part which is produced in particular by molding or injection molding from a liquid polymer compound or from a liquid prepolymer. Thus, the one-piece shaped part may, for example, be manufactured from an epoxy or polyurethane resin.

In accordance with the comments above, it may be preferable for the ceramic filter membranes to be fixed irremovably in the sockets. This applies particularly for cases in which the ceramic filter membranes are molded into the mount. Separation of the filter membrane and mount then involves destruction of at least one of the parts.

As already mentioned, a filter unit preferably has at least two filter membranes. Depending on the individual case, however, the number of filter membranes may vary very widely. For instance, filtration devices having a few dozen to several hundred filter membranes may also readily be envisaged.

Preferably, the at least two filter membranes of the filter unit are essentially arranged mutually parallel. In this case, it is furthermore preferable for the distance between a plurality of filter membranes, essentially arranged mutually parallel, to be essentially always the same.

The mount is preferably formed so that it has a frame with preferably a rectangular or square cross section, and at least one crossmember inside the frame, preferably a plurality of crossmembers arranged mutually parallel.

The intermediate spaces between the frame and the at least one crossmember and/or between neighboring crossmembers form the sockets in which the ceramic filter membranes are fixed. The crossmember or crossmembers are moreover preferably arranged parallel to two mutually opposite sides, in particular the longitudinal or transverse sides of a frame with preferably a rectangular or square cross section, so that they can impart a high mechanical stability to the frame in one direction.

This is important particularly when a plurality of filter units are interconnected to form a multi-part filtration device, which is likewise encompassed by our filter units. Specifically and preferably, the frame of the mount of a filter unit has at least two, preferably four or more openings, via which filtered water can be drained from the collection space. These openings are preferably located in the frame, particularly in the stabilized sides of the frame, that is to say in the sides where the crossmembers meet. Particularly preferably, one of the stabilized sides has one or two of these openings and the opposite second stabilized side likewise has one or two. The openings in the frame are preferably arranged so that a plurality of filter units can be stacked together, in which case an opening in the frame of a filter unit placed above can come to lie exactly on a corresponding opening in the frame of the underlying filter unit. With such coupling of a plurality of filter units together via the openings, the collection spaces in the mounts of the individual filter units stacked on one another are correspondingly connected to one another and a channel leading through the mounts of all the coupled filter units is formed to discharge the filtered medium, or the cleaning medium for flushing. The channel lies entirely inside the mounts, and external piping for the individual filter units is therefore unnecessary.

Preferably used filter membranes have internally lying discharge channels with outlet openings which lie on at least one narrow side, preferably two mutually opposite narrow sides, of the ceramic filter membranes. It is preferable for the at least two ceramic filter membranes of a filter unit to be fixed in the at least two sockets of the mount of a filter unit so that the discharge channels, or their outlet openings, can open directly into the collection space (as already mentioned above). Preferably, to this end the narrow side or the narrow sides, on which the aforementioned outlet openings of the internally lying discharge channels are located, is or are fixed completely, that is to say over their entire length, in the sockets of the mount or if applicable of the mounts. Particularly preferably, the aforementioned crossmembers and the frame of a mount which can be used form sockets, the dimensions of which are matched exactly to the sizes of these longitudinal sides.

In a filter unit, the outlet openings preferably open into the intermediate spaces between the frame and the at least one crossmember of a mount of a filter unit and/or between its neighboring crossmembers. These intermediate spaces are preferably all connected to one another, and together they form an embodiment of the collection space mentioned above.

From the comments above, it can already preferably be seen that the collection space of an individual filter unit is formed inside the mount. On the outside, it is then preferably bounded by the aforementioned frame of the mount, the narrow sides of the filter membranes with the outlet openings and, if applicable, the crossmembers. Besides this, the mount preferably also has a cover plate which can be fitted into the frame and which closes the collection space on one side, in particular at the front. This cover plate may be formed so that it is transparent, for example, consisting of glass or plexiglass. With this configuration, the functional capacity of the filter unit can be monitored optically. The cover plate may, for example, be adhesively bonded to the frame.

Preferably, a filter unit has more than one mount in which the ceramic filter membranes are fixed. Forms in which mutually opposite narrow sides of essentially rectangular or square filter membranes are respectively fixed in a mount are particularly preferred. Preferably, the mounts are functionally identical to one another in this case, that is to say they each have the same technical features.

Preferably, the filter unit has two functionally identical mounts of the type described above, between which the at least two ceramic filter membranes are located, each of these with internally lying discharge channels for filtered water and outlet openings on mutually opposite narrow sides of the filter membranes, the filter membranes being fixed with these narrow sides in the respective at least two sockets of the two mounts. During operation, the filtered water is therefore discharged at both ends of the ceramic filter membranes (at the two mutually opposite narrow sides) via a collection space of a correspondingly arranged mount.

It should also be mentioned in passing that the filter unit may naturally also have other components besides filter membranes and mounts, for example, side walls which may optionally form a housing together with the mounts on the mutually opposite narrow sides of the ceramic filter membranes. The mounts can therefore also be used as a part of the housing of a filter unit.

The method for producing a filter unit, as described above, is distinguished in particular in that at least two ceramic filter membranes are arranged inside a mold and a mount, in which the ceramic filter membranes are fixed, is manufactured by molding or injection molding from a liquid polymer compound or from a liquid prepolymer. The liquid polymer compound or the liquid prepolymer can in this way set directly in contact with the filter membranes and exactly fits the contours of the filter membranes. It is therefore possible to match the dimensions of the sockets exactly to the sizes of the filter membranes so that no sealing means are necessary.

To produce a preferred filter unit, as is described in more detail below, preferably two or more ceramic filter membranes are preferably aligned mutually parallel in a mold, for example, by one or more positioning means (for example, grids), a defined distance preferably being maintained between neighboring membranes. The filter membranes have internally lying discharge channels and outlet openings on at least one narrow side, preferably on two opposite narrow sides, as already described above. The outlet openings are preferably closed before, or optionally after, arranging the filter membranes in the mold, for example, by a matching silicone pad. This prevents the access to the discharge channels from becoming obstructed. Finally, the liquid polymer compound or the liquid prepolymer can be introduced into the mold. It can set around the silicone pad or around an alternative equivalent closure means. The shape and volume of the silicone pad or the equivalent closure means can in this case determine the shape and volume of the resulting collection space. When the polymer compound or the liquid prepolymer sets, the aforementioned crossmembers are formed between the filter membranes and around the filter membranes of the frames described above. In these, the aforementioned cover plate may then also be adhesively bonded after the silicone pad is removed. The procedure may then be repeated if necessary, at the other end or on the other narrow side of the membranes.

Ideally, the expansion coefficient of the polymer is matched to that of the filter membranes (that is to say a matching polymer is selected). Furthermore, it should be ensured that the setting does not take place at excessively high temperatures.

In principle, a large number of known polymer compounds are suitable for use in a method, polymers based on epoxy or polyurethane resins being preferred in particular.

The filter unit is outstandingly suitable for use in the fields of application mentioned in the introduction. Besides this, it should be mentioned in particular that it is not only suitable for water treatment but can be used in general for solid-liquid, liquid-solid and liquid-liquid filtration.

The aforementioned advantages, and other advantages, derive from the examples described below in connection with the figures. The individual features may respectively be implemented individually or in combination with one another. The examples described below merely serve for explanation and better understanding, and are in no way to be understood as restrictive.

FIG. 1 shows a filter unit 100 consisting of a plurality of ceramic filter membranes 101 and two functionally identical mounts 102, between which the filter membranes 101 are fixed and into which the filter membranes are molded. Both mounts have the same technical features, which will be explained below with reference to the front mount. The filter membranes 101 are arranged mutually parallel and (except for one) have an essentially uniform spacing from one another. The mounts 102 each consist of a molded plastic part comprising a frame 103 and a plurality of crossmembers 104, and a cover plate 105 formed as a sheet of plexiglass. The filter membranes have internally lying discharge channels for filtered water, the outlet openings of which are located on two mutually opposite narrow sides of the filter membranes. Between the frame 103 and the two outer-lying crossmembers 104, and between crossmembers 104 respectively neighboring one another directly, there are intermediate spaces which form sockets in which the ceramic filter membranes 101 are fixed without a seal and free from adhesive. The outlet openings of the filter membranes 101 open directly into these intermediate spaces. The intermediate spaces between the crossmembers 104 and between the frame 103 and the crossmembers 104 are all connected to one another in a communicating fashion, and together they form a collection space for the filtered water which is closed at the front by the plexiglass sheet 105. Elsewhere, the collection space is bounded externally by the mount 102 (or by its frame 103 and the crossmembers 104) and the narrow sides of the filter membranes 101 with the outlet openings. Filtered water can be discharged from the collection space via the two openings 106. At the same time, the openings 106 may however also be used to couple on further filter units (or their frames). To this end, a sealing ring may be put into the shoulder 107. A second filter unit (identical to the one represented here) can then be arranged on the one represented here in a stacked fashion, so that its lower opening 106 comes to lie on the upper opening 106 of the filter unit represented.

With such coupling of a plurality of filter units 100 to one another via the openings 106, a channel leading through all the coupled filter units 100 is formed for discharging filtered medium or cleaning medium for flushing. Exact positioning of a plurality of filter units 100 coupled together may, for example, be achieved by means of adjustment bolts. Further railing or direct mounting by means of screw connections is therefore not absolutely necessary on the individual filter units 100. The filter units 100 coupled to form a unit may, for example, be firmly clamped together by means of a bar system and thereby held together, so that they can be lifted together.

Figure 2A:
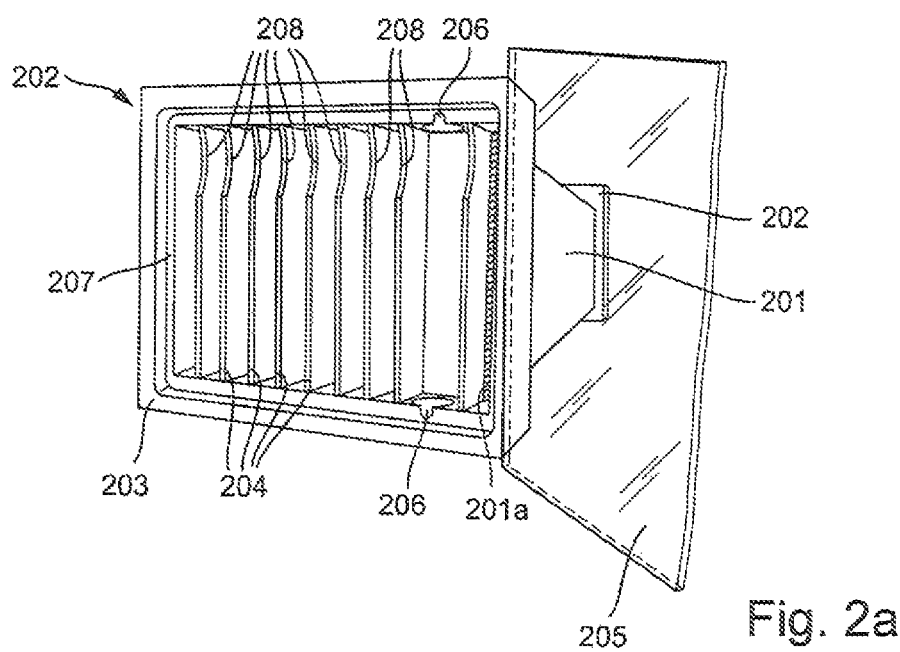
FIG. 2a shows a front view of the filter unit represented in FIG. 1 (obliquely from the front).

FIG. 2a shows a front view of the filter unit 100 represented in FIG. 1. Here again, the ceramic filter membranes 201 and the mounts 202 with the frame 203, the crossmembers 204, the cover plate or plexiglass sheet 205 (not closed here) and the openings 206 can be seen. The upper and lower sides of the frame 203 are stabilized by the crossmembers 204 which meet them. The narrow side 201a of one of the filter membranes can be seen clearly between one of the crossmembers 204 and the right-hand side of the frame 203. The outlet openings of the collection channels located inside the filter membrane 201 are clearly visible.

The frame has a shoulder 207, into which the plexiglass sheet 205 can be lowered. The sheet may, for example, be fixed in the shoulder by adhesive bonding. On their upper end, the crossmembers 204 have indentations 208, which ensure that filtered water from each individual membrane can reach the opening 206. Furthermore, degassing of the filter unit can be carried out via these indentations. The free intermediate spaces between the members 204 or between the members 204 and the frame 203, as well as the plexiglass sheet, together form the aforementioned collection space for filtered water.

Figure 2B:
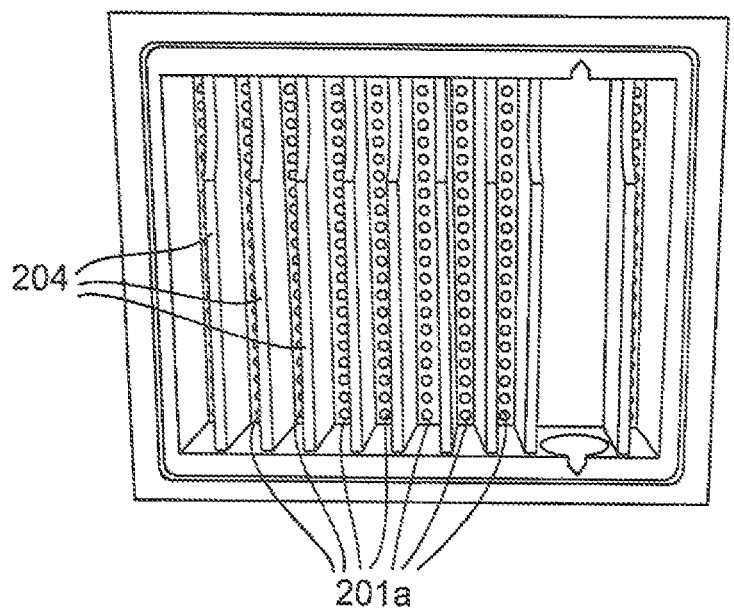
FIG. 2b shows another front view of the filter unit represented in FIG. 1 (frontally from the front).

In FIG. 2b, the narrow sides 201a, lying between the crossmembers 204, of the filter membranes 101 of the filter unit 100 are in particular clearly visible.

The invention claimed is:

1. A filter unit for treating water comprising:
at least two ceramic filter membranes; and
a mount for the at least two ceramic filter membranes, wherein
the ceramic filter membranes are formed in the shape of plates and each have a filter-active outer side and at least one internally lying discharge channel for filtered water,
the mount has a collection space, via which water leaving the discharge channels can be drained, and
the mount has at least two sockets that liquid-tight fix the at least two ceramic filter membranes in which they are fixed so that the internally lying discharge channels are in communicating connection with the collection space and at least the part of the mount having the sockets for the ceramic filter membranes is a shaped part formed in one piece and the collection of space is formed inside the mount, wherein the discharge channels of the at least two ceramic filter membranes open directly into the collection space.

2. The filter unit of claim 1, wherein the ceramic filter membranes are fixed in the sockets without a seal.

3. The filter unit of claim 1, wherein the ceramic filter membranes are fixed in the sockets without an adhesive.

4. The filter unit of claim 1, wherein the one-piece shaped part is a plastic part produced by molding or injection molding from a liquid polymer compound or from a liquid prepolymer.

5. The filter unit of claim 1, wherein the one-piece shaped part is manufactured from an epoxy or polyurethane resin.

6. The filter unit of claim 1, wherein the ceramic filter membranes are fixed irremovably in the sockets.

7. The filter unit of claim 1, wherein the at least two ceramic filter membranes are arranged mutually parallel.

8. The filter unit of claim 1, wherein the mount has a frame and at least one crossmember inside the frame, intermediate spaces between the frame and the at least one crossmember and/or between neighboring crossmembers forming the sockets in which the ceramic filter membranes are fixed.

9. The filter unit of claim 1, wherein the outlet openings of the internally lying discharge channels each lie on at least one narrow side of the ceramic filter membranes.

10. The filter unit of claim 8, wherein the outlet openings open between the frame and the at least one crossmember and/or between neighboring crossmembers.

11. The filter unit of claim 1, having more than one mount in which the ceramic filter membranes are fixed.

12. The filter unit of claim 1, having at least two openings via which filtered water can be discharged from the collection space in the frame of the mount at least one opening in one side of the frame and a second opening in the opposite side.

13. The filter unit of claim 1, which is part of a filtration device which comprises at least two filter units.

14. The filter unit of claim 13, wherein at least two filter units are coupled to one another so that the collection spaces in their mounts are correspondingly connected to one another via the at least two openings.

* * * * *